US007584099B2

(12) United States Patent
Ma et al.

(10) Patent No.: US 7,584,099 B2
(45) Date of Patent: Sep. 1, 2009

(54) METHOD AND SYSTEM FOR INTERPRETING VERBAL INPUTS IN MULTIMODAL DIALOG SYSTEM

(75) Inventors: Changxue C. Ma, Barrington, IL (US); Harry M. Bliss, Evanston, IL (US); Yan M. Cheng, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 239 days.

(21) Appl. No.: 11/100,185

(22) Filed: Apr. 6, 2005

(65) Prior Publication Data

US 2006/0229862 A1  Oct. 12, 2006

(51) Int. Cl.
*G10L 15/00* (2006.01)
(52) U.S. Cl. .................. 704/240; 704/239; 704/242
(58) Field of Classification Search .......... 704/240, 704/257, 231, 235, 239, 238, 242
See application file for complete search history.

(56) References Cited

U.S. PATENT DOCUMENTS

| 5,357,596 | A * | 10/1994 | Takebayashi et al. | 704/275 |
| 6,519,562 | B1 * | 2/2003 | Phillips et al. | 704/240 |
| 6,567,778 | B1 * | 5/2003 | Chao Chang et al. | 704/257 |
| 6,785,651 | B1 * | 8/2004 | Wang | 704/246 |
| 7,127,393 | B2 * | 10/2006 | Phillips et al. | 704/240 |
| 2003/0083876 | A1 * | 5/2003 | Lin | 704/251 |
| 2004/0230434 | A1 * | 11/2004 | Galanes et al. | 704/270.1 |

OTHER PUBLICATIONS

Hazen, T.; Seneff, S.; Polifroni, J. "Recognition Confidence Scoring and Its Use in Speech Understanding Systems" Spoken Language Systems Group, MIT Laboratory for Computer Science, Cambridge, MA. USA Computer Speech and Language (2002) 16, 49-67 http://www.idealibrary.com.

Bohus, D.; Rudnicky, A.; "Integrating Multiple Knowledge Sources for Utterance-Level Confidence Annotation in the CMU Communicator Spoken Dialog System" Nov. 2002 School of Computer Science, Carnegie Mellon University Pittsburgh, PA USA.

Didier Guillevic, Simona Gandrabur and Yves Normandin, "Robust Semantic Confidence Scoring," International Conference on Spoken Language Processing 2002 (ICSLP 2002), pp. 853-856, Denver, Colorado, Sept. 2002, USA.

Gethin Williams, "A Study of the Use and Evaluation of Confidence Measures in Automatic Speech Recognition," Technical Report CS-98-02, Department of Computer Science, University of Sheffield, Mar. 22, 1998, 52 pages.

Weintraub, et al., "Neural-Network Based Measures of Confidence for Word Recognition," Speech Technology and Research Laboratory, SRI International, Menlo Park, CA, USA, 1997, 4 pages.

Stemmer, et al., "Comparison and Combination of Confidence Measures," Universitat Erlangen-Nurnberg, Lehrstuhl fur Mustererkennung, Erlangen, Germany, 2002, 8 pages.

Wikipedia, "Likelihood Function," Wikipedia Foundation, Inc, Apr. 28, 2007, 5 pages.

Huang, et al., "Spoken Language Processing, A Guide to Theory, Algorithm, and System Development," Prentice-Hall, Inc., Upper Saddle River, New Jersey, USA, 2001, pp. 415-416, 608-609, 139 and 104.

Huang, et al., "Spoken Language Processing, A Guide to Theory, Algorithm, and System Development" Prentice-Hall, Inc., Upper Saddle River, New Jersey, USA, 2001, Cover, Contents p. xiii, and pp. 453-457.

* cited by examiner

*Primary Examiner*—Huyen X. Vo

(57) ABSTRACT

A method, a system and a computer program product for interpreting a verbal input in a multimodal dialog system are provided. The method includes assigning (302) a confidence value to at least one word generated by a verbal recognition component. The method further includes generating (304) a semantic unit confidence score for the verbal input. The generation of a semantic unit confidence score is based on the confidence value of at least one word and at least one semantic confidence operator.

15 Claims, 4 Drawing Sheets

METHOD AND SYSTEM FOR INTERPRETING VERBAL INPUTS IN MULTIMODAL DIALOG SYSTEM

FIELD OF THE INVENTION

The present invention relates to the field of software, and more specifically, it relates to interpreting verbal inputs in a multimodal dialog system.

BACKGROUND OF THE INVENTION

Dialog systems allow a user to interact with a system to perform tasks such as retrieving information, conducting transactions, planning, and other such problem solving tasks. A dialog system can use several input modalities for interaction with a user. Examples of input modalities include keyboards, touch screens, touch pads, microphones, gaze, video cameras, etc. Employing multiple modalities enhances user-system interactions in dialog systems. Dialog systems that use multiple modalities for user-system interaction are known as multimodal dialog systems. The user interacts with a multimodal system, using a dialog-based user interface. A set of interactions between the user and the multimodal dialog system is known as a dialog. Each interaction is referred to as a user turn.

A multimodal dialog system can be a verbal dialog system that accepts verbal inputs. A verbal dialog system includes an automatic speech recognition (ASR) modality, a handwriting modality, and any other modality that interprets user inputs into text inputs. Correct recognition of verbal inputs to a voice dialog system is important for reducing errors in interpreting the verbal inputs and subsequent actions taken. The verbal input is recognized by assigning confidence scores to words in the verbal input. These word confidence scores are further used to generate a confidence score for the verbal input. The verbal input is accepted or rejected based on the confidence score for the verbal input.

A known method of confidence scoring for use in speech understanding systems generates confidence scores at the phonetic, word and utterance levels. The method generates utterance level confidence scores based on word confidence scores. Another known method describes a robust semantic confidence score generator that calculates confidence score at the concept-level. The method applies various confirmation strategies directly at the concept level. Further, the method generates an N-best list for training a classifier.

Yet another known method for integrating multiple knowledge sources for utterance-level confidence annotation in the Carnegie Mellon University (CMU) communicator spoken dialogue system feeds features from speech recognition, parsing and dialog management to a learner such as artificial neural network (ANN). The CMU communicator is a telephone-based spoken dialog system that operates in the air-travel planning domain and provides the framework and the target platform for the development of the utterance-level confidence annotator.

However, each of the above methods has one or more of the following disadvantages. The generation of word confidence scores does not involve use of semantics. If the utterance level confidence score is low, it is rejected. However, if the utterance level confidence score is not low, a word graph with the rejected words is parsed to generate a parse score. Further, there is a lack of training data required for the training classifier.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DETAILED DESCRIPTION OF THE INVENTION

Figure 1:
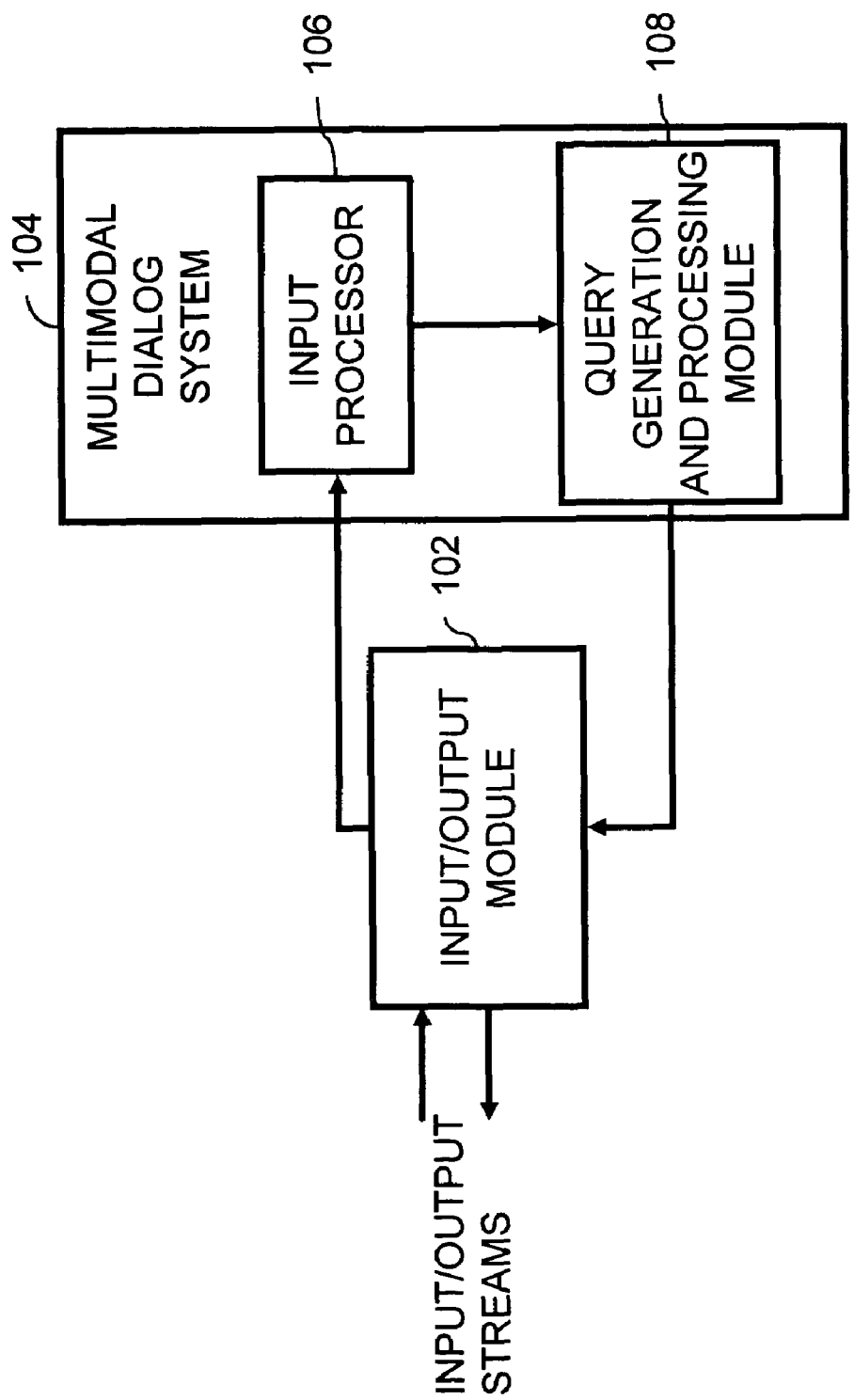
FIG. 1 is a representative environment of a multi-modal dialog system, in accordance with some embodiments of the present invention.

Before describing in detail a method and system for interpreting verbal inputs in accordance with embodiments of the present invention, it should be observed that the embodiments of the present invention reside primarily in combinations of method steps and system components related to controlling of input modalities. Accordingly, the method steps and the system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Referring to FIG. 1, a block diagram shows a representative environment in which the present invention may be practiced, in accordance with some embodiments of the present invention. The representative environment consists of an input/output module 102 and a multimodal dialog system 104. In an embodiment of the invention, the multimodal dialog system 104 is a modular portable dialog (MPD) system. An MPD uses a sequence of semantic frames, which describe a sub-goal in terms of a relation between one or more semantic units and one or more actions, to achieve a user's goal. The input/output module 102 is responsible for receiving user inputs and displaying system outputs and can be a user interface, such as a computer monitor, a touch screen, a keyboard, or a combination of these. A user interacts with the multimodal dialog system 104 via the input/output module 102. The user's interaction with the multimodal dialog system 104 is known as a dialog. Each dialog may comprise a number of interactions between the user and the multimodal dialog system 104. Each interaction is referred to as a user turn of the dialog. The information provided by the user at each user turn of the dialog is known as a context of the dialog.

The multimodal dialog system 104 comprises an input processor 106 and a query generation and processing module 108. The input processor 106 interprets and processes the input from a user and provides the interpretation to the query generation and processing module 108. The query generation and processing module 108 further processes the interpretation and performs tasks such as retrieving information, conducting transactions, and other such problem-solving tasks. The results of the tasks are returned to the input/output module 102, which displays them to the user.

Figure 2:
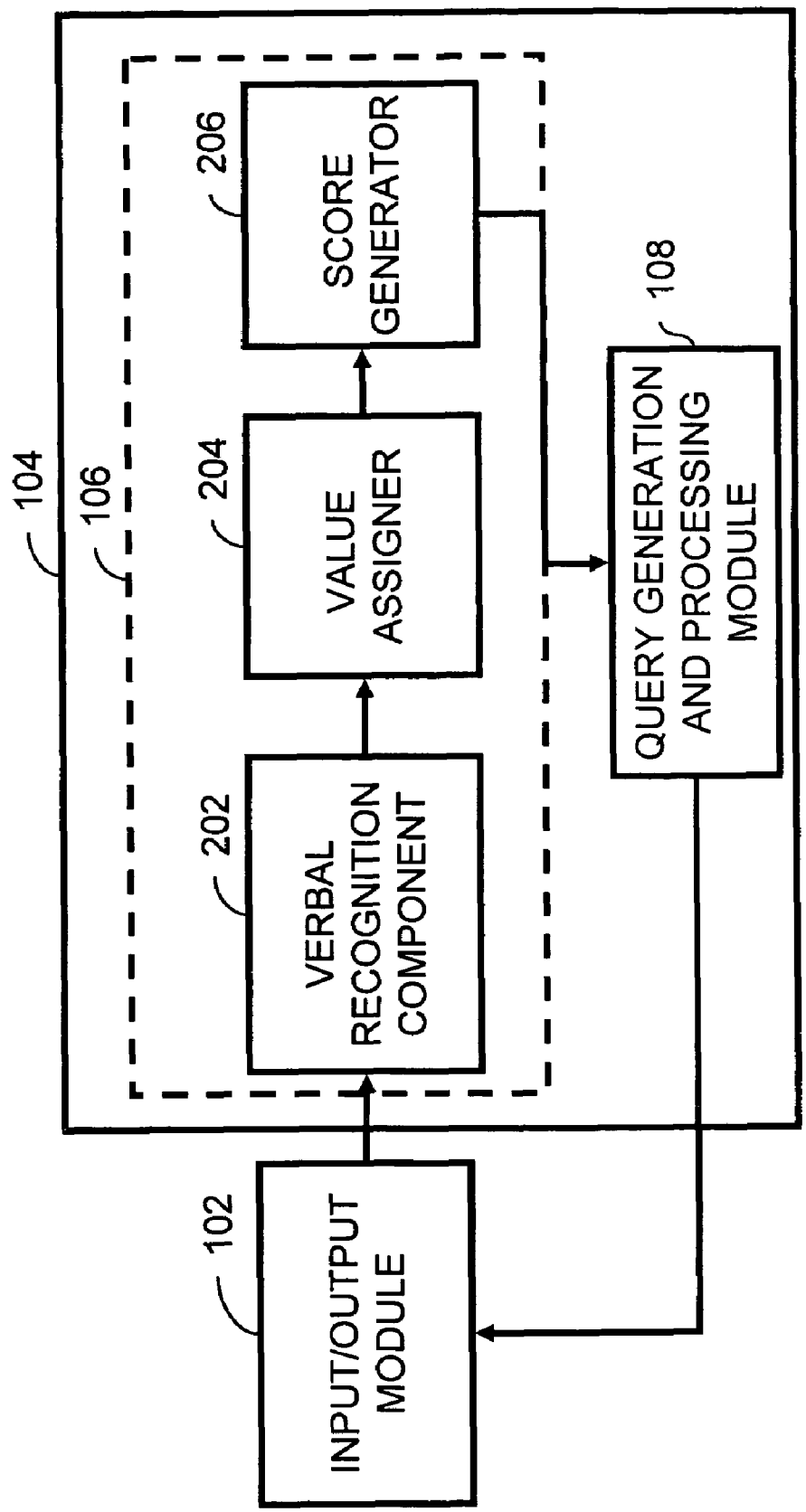
FIG. 2 is a block diagram of a multimodal dialog system for interpreting verbal inputs, in accordance with some embodiments of the present invention.

Referring to FIG. 2, a block diagram shows the multimodal dialog system 104 for interpreting verbal inputs, in accordance with some embodiments of the present invention. The input processor 106 comprises a verbal recognition component 202, a value assigner 204 and a score generator 206. In an embodiment of the invention, the input to the multimodal dialog system 104 is a verbal input. The verbal input may be given through an automatic speech recognition (ASR) modality, a handwriting modality, or any other input modality that interprets user input into text input. The verbal input consists of at least one word generated by the verbal recognition component 202. The verbal recognition component 202 generates words based on a recognition grammar present in the multimodal dialog system 104. In an embodiment of the invention, the recognition grammar present in the multimodal dialog system 104 is semantically tagged, i.e., the recognition grammar comprises at least one semantic tag definition.

The value assigner 204 assigns a confidence value to the at least one word recognized by the verbal recognition component 202. Therefore, each word is associated with a confidence value assigned by the value assigner 204. A confidence value is a measure of the accuracy of the verbal recognition component 202. The confidence value is assigned to each word, based on the word's semantic importance. As an example, consider a multimodal dialog system such as a cell phone that has a program, by means of which a user makes a call to a person, by name, at a particular place. The input to the program includes the name of a person and a place. Therefore, the recognition grammar for the verbal input to the program searches the verbal input for the name of a person and a place, and assigns semantic tags to the name and place. For instance, a person called Steve is to be called at his office. The recognition grammar assigns a semantic tag, <name>, to Steve and another semantic tag, <place>, to office.

The user can initiate this call in different ways. For example, the user can say, "Call Steve at office, please", or "Steve at office", or "Office number for Steve". In the above call, only Steve and office are semantically tagged with <name> and <place>, respectively. A confidence value is assigned only to the words that are semantically tagged. Thereafter, based on the confidence value of the words that are semantically tagged, actions are taken by the multimodal dialog system 104. When the confidence value of a word is less than a pre-determined threshold value, a clarification dialog is generated by the multimodal dialog system 104. In an embodiment of the invention, if the confidence value of the name and place in the above-mentioned semantic call is more than the pre-determined threshold value, Steve is called at his office. However, if the confidence value of name is less than the pre-determined threshold value, and the confidence value of place is more than the pre-determined threshold value, a clarification dialog that asks, "Call whom?" is generated. Conversely, if the confidence value of name is more than the pre-determined threshold value and the confidence value of place is less than the threshold value, a clarification dialog that asks, "Call where? Work or home?" is generated. A semantic tag may therefore comprise (as in existing systems) a recognized word and its confidence value. However, in accordance with embodiments of the present invention, a semantic tag may also comprise at least one word recognized by the verbal recognition component 202, along with a confidence value assigned to each word by the value assignor 204, and at least one semantic confidence operator.

When a semantic tag consists of more than one word, a semantic unit confidence score for the verbal input is generated by the score generator 206. The score generator 206 generates the semantic unit confidence score based on the contribution of each word generated by the verbal recognition component 202 to the semantic tag. This is done with the help of the semantic confidence operators in a semantic tag. Examples of semantic confidence operators include an average operator, a selector operator, a maximum confidence operator, and a minimum confidence operator.

In the case of an average operator, weights are assigned to particular words in a semantic tag. For example, consider a multimodal dialog system with an application, which dials names from a list. Suppose the names in the list are, 'Steve Nowlan', 'Steve Albrecht', etc. In such a case, more weight may be assigned to Nowlan and Albrecht, in the semantic tag <name>, since the first name (Steve) is common. In an embodiment of the invention, the semantic unit confidence score of the name (<cf. name>) can be calculated as:

<cf. name>=0.7*(cf. Nowlan)+0.3*(cf. Steve)

wherein (cf. Nowlan) is the confidence value of the word "Nowlan" and (cf. Steve) is the confidence value of the word "Steve"

In the above example, the second name, Nowlan, is assigned more weight (0.7) compared to the weight assigned to the first name (0.3).

In the case of a selector operator, the semantic unit confidence score is generated by selecting the confidence value of a particular word from the semantic tag. For example, if the last name can identify a person in a list, the semantic unit confidence score for a name is generated by selecting the confidence value of only the last name, as given below.

<cf. name>=Selector(cf. last name)

In the case of a maximum confidence operator, the semantic unit confidence score is generated by selecting the maximum confidence value from the words that uniquely identify an action. For example, consider a multimodal dialog system that has an application for dialing names from a name list. The name list comprises a name Harry<first name> Bliss<last name>. If the first name (Harry) and the last name (Bliss) are unique in the name list, i.e., either Harry or Bliss can uniquely identify the person, the confidence score is calculated as:

<cf. name>=max(last name, first name)

In the case of a minimum confidence operator, the semantic unit confidence score is generated by selecting the minimum confidence value from the words in the semantic tag. For example, in an application for dialing digits, if a number is dialed by saying, "Please call 847-555-5555", the confidence score is calculated as:

<cf. name>=min(cf. digit)

In the above-given example, the confidence score is calculated by selecting the minimum confidence value from the confidence value of the digits. The minimum confidence value is selected because if any one of the digits were recognized incorrectly the whole number would be a wrong number.

In an embodiment of the invention, the semantic unit confidence score can be further used to generate a semantic group confidence score. The semantic group confidence score is based on the semantic unit confidence score and at least one other semantic unit confidence score that was earlier generated during a turn of the dialog. For example, consider a verbal input in a turn of a dialog that says, "I want to go from New York to London". Further, another verbal input in the turn of the dialog specifies, "I want to go on the trip on Wednesday, Feb. 02, 2005". A semantic unit confidence score is generated for each of the verbal inputs. A semantic group confidence score related to the trip can be generated, based on the semantic unit confidence scores for the two verbal inputs. In this example, the tags are <from-place> New York, <to-place> London, and <time-tag> Wednesday. These tags are semantically important. We take a minimum of the three. If the tag with the lowest confidence is lower than the threshold, the next dialogue can get the next verbal input and update the scores of the three tags. If the minimum of the updated three tags score is greater than the threshold, the dialogue ends.

In another embodiment of the invention, the semantic unit confidence score can be used to generate a semantic sentence score, which is generated by combining the semantic unit confidence scores of different verbal inputs in a sentence. For instance, consider a verbal input consisting of a sentence that calls a person on one of his many numbers, for example, "Call Harry Bliss from the phone list on 847-555-5555". As explained earlier, a semantic unit confidence score is generated for the verbal input 'Harry Bliss' and for the verbal input '847-555-5555'. Therefore, these two semantic unit confidence scores can be combined to generate a semantic sentence score for the sentence used as the verbal input. In this example, we select to check the confidence score of the <phone number> tag. If its score is greater than the threshold, the action is ensued. Then the tag <name> is greater than the threshold, the dialogue asks for the digit input again, otherwise, the dialogue asks the user to repeat.

In yet another embodiment of the invention, the semantic unit confidence score can be used to generate a semantic turn confidence score for the verbal inputs given in a turn of a dialog. A verbal input during a turn of a dialog can have more than one sentence. A semantic turn confidence score is based on at least two of, the semantic unit confidence score, at least one other semantic unit confidence score, and a semantic sentence score. A semantic turn confidence score is generated by combining the different semantic sentence scores, semantic group confidence scores, and semantic unit confidence scores. The purpose of the score is to check the total quality of the user inputs. We can record the tags with minimum, the maximum scores and check the input quality of the dialogue.

An error dialog is initiated when the semantic unit confidence score is less than a threshold value. Further, a confirmation dialog may be generated to confirm a verbal input when the semantic unit confidence score is less than the threshold value.

Figure 3:
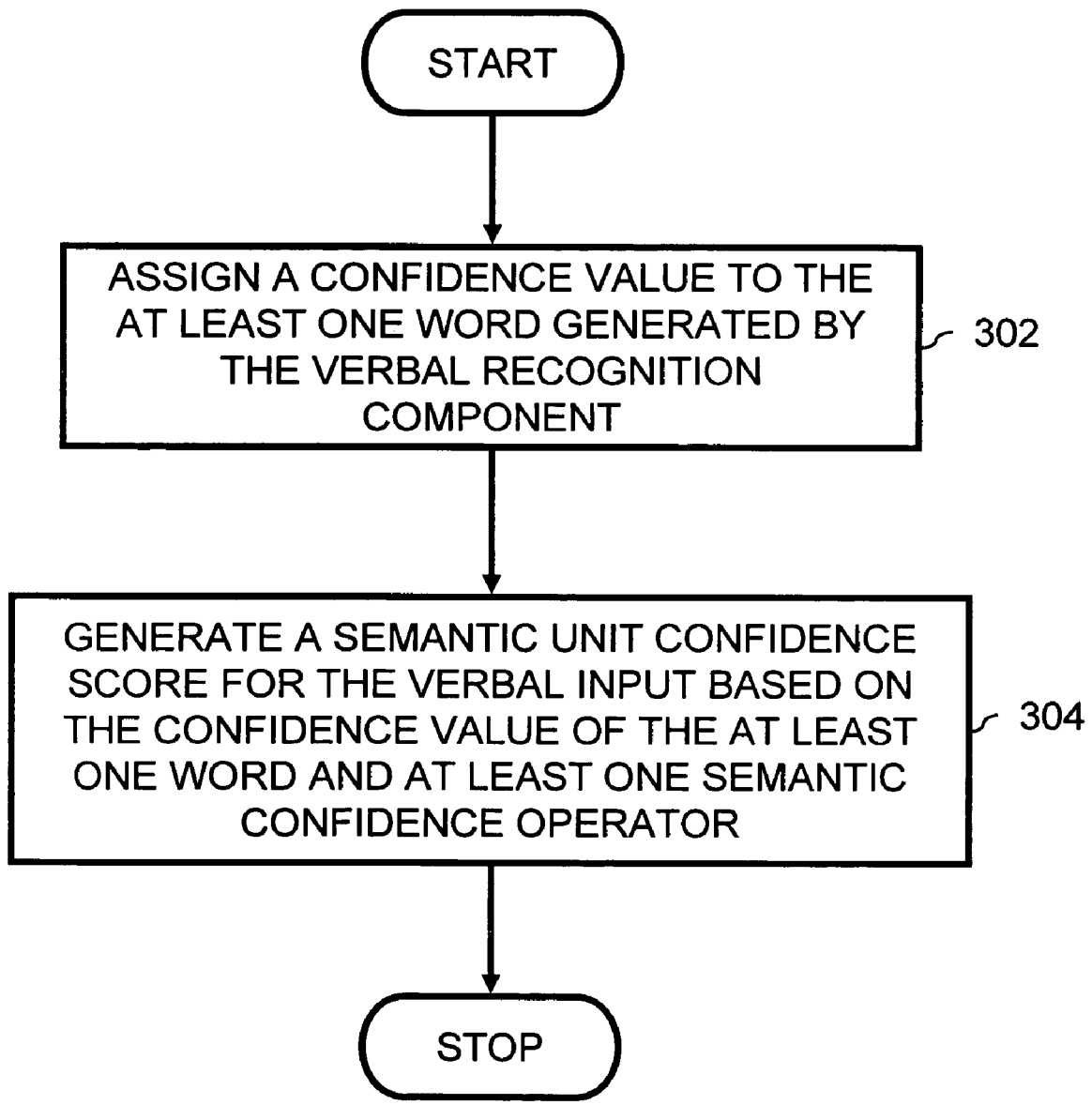
FIG. 3 is a flowchart illustrating a method for interpreting verbal inputs in a multimodal dialog system, in accordance with some embodiments of the present invention.

Referring to FIG. 3, a flowchart illustrates a method for interpreting verbal inputs in the multimodal dialog system 104, in accordance with some embodiments of the present invention. The verbal input comprises at least one word generated by the verbal recognition component 202. At step 302, a confidence value is assigned to the at least one word. In an embodiment of the invention, the confidence value is assigned by the value assigner 204. At step 304, a semantic unit confidence score is generated for the verbal input based on the confidence value of the at least one word and at least one semantic confidence operator. In an embodiment of the invention, the semantic unit confidence score is generated by the score generator 206. The semantic unit confidence score is used to interpret the verbal input.

Figure 4:
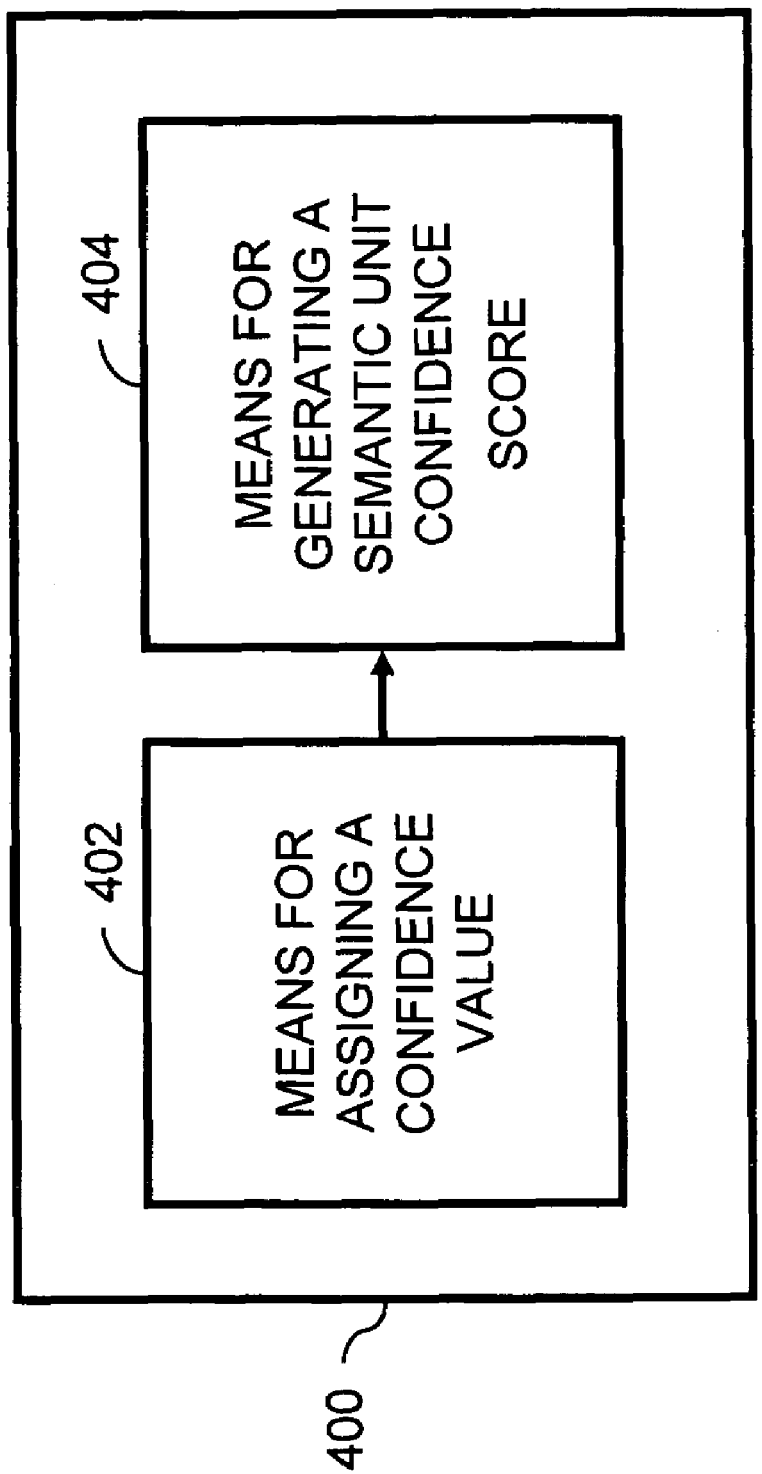
FIG. 4 is a block diagram illustrating an electronic device for interpreting verbal inputs in a multimodal dialog system, in accordance with some embodiments of the present invention.

Referring to FIG. 4, an electronic device 400 for interpreting a verbal input in the multimodal dialog system 104, in accordance with some embodiments of the present invention is shown. The electronic device 400 comprises a means for assigning 402 and a means for generating 404. The verbal input comprises at least one word generated by the verbal recognition component 202. The means for assigning 402 assigns a confidence value to the at least one word generated by the verbal recognition component 202. The means for generating 404 generates a semantic unit confidence score for the verbal input. The semantic unit confidence score is based on the confidence value of the at least one word and at least one semantic confidence operator.

The technique of interpreting a verbal input in a multimodal dialog system as described herein can be included in complicated systems, for example a vehicular driver advocacy system, or such seemingly simpler consumer products ranging from portable music players to automobiles; or military products such as command stations and communication control systems; and commercial equipment ranging from extremely complicated computers to robots to simple pieces of test equipment, just to name some types and classes of electronic equipment.

It will be appreciated that the interpretation of a verbal input described herein may be performed by one or more conventional processors and unique stored program instructions that control the one or more processors to implement some, most, or all of the functions described herein, such as the functions of assigning a confidence value and generating a semantic unit confidence score for the verbal input, which may be interpreted as being steps of a method. Alternatively, the same functions could be implemented by a state machine that has no stored program instructions, in which case each function or some combinations of certain portions of the functions are implemented as custom logic. A combination of the two approaches could be used. Thus, methods and means for performing these functions have been described herein.

In the foregoing specification, the present invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

The term "another" and "one other", as used herein are defined as at least a second or more. The terms "including" and/or "having", as used herein, are defined as comprising. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for interpreting a verbal input in a multimodal dialog system, the multimodal system being an apparatus that comprises input and output devices and a processing system, the method comprising:
   receiving the verbal input at an input device of the multi modal dialog system,
   generating a word sequence from the verbal input by a verbal recognition component of the processing system using a recognition grammar, the word sequence comprising at least one word that is semantically tagged;
   assigning by a value assigner component of the processing system a confidence value to each of the at least one word generated by the verbal recognition component, based on the word's semantic importance;
   generating by a score generator of the processing system a semantic unit confidence score for the word sequence, the generation of the semantic unit confidence score being based on the confidence value of each of the at least one word and at least one semantic confidence operator; and
   generating an output by a human interface output device based on the semantic unit confidence score.

2. The method for interpreting a verbal input in accordance with claim 1 wherein the generation of the semantic unit confidence score is based on a semantic tag of a recognition grammar.

3. The method for interpreting a verbal input in accordance with claim 2 wherein the semantic tag comprises the at least one semantic confidence operator, the at least one word, and a confidence value associated with each of the at least one word.

4. The method for interpreting a verbal input in accordance with claim 1 wherein the at least one semantic confidence operator is selected from a group consisting of average, selection, maximum confidence and minimum confidence.

5. The method for interpreting a verbal input in accordance with claim 1 wherein the multimodal dialog system is a modular-portable dialog (MPD) system.

6. The method for interpreting a verbal input in accordance with claim 1 further comprising:
   initiating an error dialog when the semantic unit confidence score is less than a threshold value.

7. The method for interpreting a verbal input in accordance with claim 1, wherein a semantic group confidence score is generated from the semantic unit confidence score and at least one other semantic unit confidence score during a turn of the dialog.

8. The method for interpreting a verbal input in accordance with claim 7 wherein one of a semantic sentence and a semantic turn confidence score is generated from more than one of: the semantic unit confidence score; the at least one other semantic unit confidence score; and a semantic sentence score.

9. A multimodal dialog system for interpreting a verbal input, the multimodal dialog system comprising:
   an input device that receives the verbal input;
   an input processor that comprises:
      a verbal recognition component that generates a word sequence comprising at least one word from the verbal input using on a recognition grammar, the word sequence comprising at least one word that is semantically tagged,
      a value assigner component, that assigns a confidence value to each of the at least one word generated by the verbal recognition component, based on the word's semantic importance, and
      a score generator that generates a semantic unit confidence score for the verbal input, the generation of the semantic unit confidence score being based on the confidence value of the at least one word and at least one semantic confidence operator; and
   a human output device that generates a human interface output based on the semantic unit confidence score.

10. The multimodal dialog system in accordance with claim 9 wherein the generation of the semantic unit confidence score is based on a semantic tag of a recognition grammar.

11. The multimodal dialog system in accordance with claim 10 wherein the semantic tag comprises the at least one semantic confidence operator, the at least one word, and a confidence value associated with each of the at least one word.

12. The multimodal dialog system in accordance with claim 9 wherein the at least one semantic confidence operator is selected from a group consisting of average, selection, maximum confidence and minimum confidence.

13. The multimodal dialog system in accordance with claim 9 wherein an error dialog is initiated when the semantic unit confidence score is less than a threshold value.

14. The multimodal dialog system in accordance with claim 9 wherein a semantic group confidence score is generated from the semantic unit confidence score and at least one other semantic unit confidence score during a turn of the dialog.

15. The multimodal dialog system in accordance with claim 14 wherein one of a semantic sentence and a semantic turn confidence score is generated from more than one of: the semantic unit confidence score; the at least one other semantic unit confidence score; and a semantic sentence score.

* * * * *